United States Patent
Muraoka et al.

(10) Patent No.: US 12,218,313 B2
(45) Date of Patent: Feb. 4, 2025

(54) NONAQUEOUS ELECTROLYTE SECONDARY BATTERY

(71) Applicant: Prime Planet Energy & Solutions, Inc., Tokyo (JP)

(72) Inventors: Masashi Muraoka, Kakogawa (JP); Kazuki Takeno, Takasago (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 463 days.

(21) Appl. No.: 17/727,813

(22) Filed: Apr. 25, 2022

(65) Prior Publication Data

US 2022/0344722 A1 Oct. 27, 2022

(30) Foreign Application Priority Data

Apr. 26, 2021 (JP) ................................. 2021-073929

(51) Int. Cl.
*H01M 10/0587* (2010.01)
*H01M 10/0569* (2010.01)
*H01M 4/02* (2006.01)

(52) U.S. Cl.
CPC ... *H01M 10/0587* (2013.01); *H01M 10/0569* (2013.01); *H01M 2004/021* (2013.01); *H01M 2004/027* (2013.01); *H01M 2300/0028* (2013.01)

(58) Field of Classification Search
None
See application file for complete search history.

(56) References Cited

U.S. PATENT DOCUMENTS

| | | | |
|---|---|---|---|
| 2006/0111625 A1 | 5/2006 | Yamauchi et al. | |
| 2009/0291355 A1 | 11/2009 | Baba et al. | |
| 2012/0251868 A1* | 10/2012 | Shinohara | B32B 27/32 |
| | | | 429/144 |
| 2015/0017510 A1 | 1/2015 | Terado | |
| 2020/0106072 A1 | 4/2020 | Yogo et al. | |

(Continued)

FOREIGN PATENT DOCUMENTS

| | | |
|---|---|---|
| JP | 2006107742 A | 4/2006 |
| JP | 2006164956 A | 6/2006 |
| JP | 2011-090947 A | 5/2011 |

(Continued)

*Primary Examiner* — Wyatt P McConnell
(74) *Attorney, Agent, or Firm* — HAUPTMAN HAM, LLP

(57) ABSTRACT

A nonaqueous electrolyte secondary battery includes an exterior package, an electrode assembly, and an electrolyte solution. In a cross section orthogonal to a winding axis of the laminated assembly, the electrode assembly has a contour line having a corner-rounded rectangular shape. The contour line consists of a first arc-shaped portion, a straight line portion, and a second arc-shaped portion. The contour line has a height ratio ($R_1 = H_0/H_1$) of 1.20 to 1.35. $H_0$ represents a distance between two points most distant from each other on the contour line. $H_1$ represents an average length of the two line segments. The separator includes a first main surface and a second main surface. The first main surface is in contact with the negative electrode plate. A first dynamic coefficient of friction between the first main surface and the negative electrode plate is 0.52 to 0.66.

5 Claims, 5 Drawing Sheets

(56) References Cited

U.S. PATENT DOCUMENTS

2020/0176742 A1 6/2020 Fukunaga et al.
2021/0050577 A1 2/2021 Ka et al.

FOREIGN PATENT DOCUMENTS

| JP | 2013178952 A | 9/2013 |
| JP | 201885180 A | 5/2018 |
| JP | 2020-053343 A | 4/2020 |
| KR | 1020160092063 A | 8/2016 |
| KR | 10-2019-0126144 A | 11/2019 |
| WO | 2007037145 A1 | 4/2007 |

* cited by examiner

NONAQUEOUS ELECTROLYTE SECONDARY BATTERY

This nonprovisional application is based on Japanese Patent Application No. 2021-073929 filed on Apr. 26, 2021, with the Japan Patent Office, the entire contents of which are hereby incorporated by reference.

BACKGROUND OF THE INVENTION

Field of the Invention

The present technology relates to a nonaqueous electrolyte secondary battery.

Description of the Background Art

WO 2007/037145 discloses that a porous layer excellent in permeability of a nonaqueous electrolyte is disposed between a negative electrode and a separator.

SUMMARY OF THE INVENTION

Generally, a nonaqueous electrolyte secondary battery (hereinafter, also simply referred to as "battery") includes an electrode assembly. The electrode assembly includes a laminated assembly. The laminated assembly is formed by layering a positive electrode plate, a separator, and a negative electrode plate. The electrode assembly can be of a wound type. That is, the electrode assembly can be formed by spirally winding the laminated assembly. The electrode assembly of the wound type may be shaped to have a flat shape. By shaping the electrode assembly to have a flat shape, the electrode assembly includes a flat portion and curved portions. In the flat portion, the laminated assembly is flat. In each of the curved portions, the laminated assembly is curved.

The electrode assembly is immersed in an electrolyte solution. The electrolyte solution may enter voids in the electrode assembly (for example, spaces between the electrodes). The electrode assembly may be expanded during charging and may be contracted during discharging. This is presumably because mainly the negative electrode plate is expanded during charging and is contracted during discharging. During charging, the electrode assembly may be expanded and the voids in the electrode assembly may be decreased. The decrease of the voids causes ejection of the electrolyte solution from the electrode assembly. During discharging, the electrode assembly is contracted and the voids in the electrode assembly are increased. The increase of the voids causes the electrolyte solution around the electrode assembly to be absorbed in the electrode assembly. However, an amount of the electrolyte solution absorbed during discharging tends to be smaller than an amount of the electrolyte solution ejected during charging. Therefore, when the battery is used for a long period of time, there may be a shortage of the electrolyte solution in the electrode assembly. The shortage of the electrolyte solution may lead to, for example, precipitation of lithium (Li).

An object of the present technology is to reduce precipitation of Li caused by long-term use.

Hereinafter, configurations, functions, and effects of the present technology will be described. However, a mechanism of function in the present specification includes presumption. The scope of the present technology is not limited by the mechanism of the function.

1. A nonaqueous electrolyte secondary battery includes an exterior package, an electrode assembly, and an electrolyte solution. The exterior package accommodates the electrode assembly and the electrolyte solution. The electrode assembly includes a laminated assembly. The laminated assembly includes a positive electrode plate, a separator, and a negative electrode plate. The separator separates the positive electrode plate and the negative electrode plate from each other. The laminated assembly is spirally wound.

In a cross section orthogonal to a winding axis of the laminated assembly, the electrode assembly has a contour line having a corner-rounded rectangular shape. The contour line consists of a first arc-shaped portion, a straight line portion, and a second arc-shaped portion. The straight line portion consists of two line segments. The straight line portion connects the first arc-shaped portion and the second arc-shaped portion to each other. The contour line has a height ratio of 1.20 to 1.35.

The height ratio is calculated by the following formula ($\alpha$):

$$R_1 = H_0/H_1 \quad (\alpha).$$

In the formula ($\alpha$), $R_1$ represents the height ratio. $H_0$ represents a distance between two points most distant from each other on the contour line. $H_1$ represents an average length of the two line segments.

The separator includes a first main surface and a second main surface. The first main surface is in contact with the negative electrode plate. A first dynamic coefficient of friction between the first main surface and the negative electrode plate is 0.52 to 0.66.

In the present technology, since the "height ratio ($R_1$)" and the "first dynamic coefficient of friction" fall within the respective specific ranges, precipitation of Li caused by long-term use can be reduced.

The electrode assembly is of a wound type. The electrode assembly has a flat shape. In the cross section orthogonal to the winding axis, the contour line of the electrode assembly has the corner-rounded rectangular shape. A line segment connecting the two points most distant from each other on the contour line is also referred to as "major axis". A direction parallel to the major axis is also referred to as "height direction". A dimension in the height direction is also referred to as "height dimension". It should be noted that the height direction is merely a designation. A relation between the height direction and the vertical direction is arbitrary.

The length of the major axis of the contour line is the "height dimension ($H_0$) of the electrode assembly". The straight line portion of the contour line consists of the two line segments. The straight line portion is the contour line of the flat portion of the electrode assembly. A portion sandwiched between the two line segments corresponds to the flat portion. The average length of the two line segments is "the height dimension ($H_1$) of the flat portion". The height dimension ($H_0$) of the electrode assembly is a total of the height dimension ($H_1$) of the flat portion and the height dimension ($H_2$) of the curved portions (see FIG. 4). As the height ratio ($R_1 = H_0/H_1$) is larger, it is indicated that a constituent ratio of the flat portion is smaller in the electrode assembly. In other words, as the height ratio is larger, a constituent ratio of the curved portions is larger in the electrode assembly.

In each of the curved portions, a space between the electrodes tends to be larger than that in the flat portion. During charging, a high pressure is applied to the electrolyte solution in the flat portion. This is presumably because the space between the electrodes is narrow. Part of the electrolyte solution pushed out from the flat portion is pushed out to the curved portion at which the pressure is relatively low. Since the height ratio is large (that is, the constituent ratio of the curved portion is large), an amount of electrolyte solution that can be stored in the curved portion (hereinafter, also referred to as "storage amount") tends to be increased during charging. Since the curved portion has an appropriate storage amount, the curved portion can have a buffer function during charging. That is, since the electrolyte solution pushed out from the flat portion is temporarily stored in the curved portion, the amount of the electrolyte solution ejected from the electrode assembly is expected to be reduced. As a result, it is expected to reduce shortage of the electrolyte solution in the electrode assembly. However, if the storage amount is too large, the precipitation of Li or the like may be promoted conversely. That is, since the electrolyte solution is likely to be stored in the curved portion, distribution of the electrolyte solution in the electrode assembly may become uneven. As a result, an electrode reaction can become uneven, with the result that Li can be precipitated locally. When the height ratio is 1.20 to 1.35, the curved portion can have an appropriate storage amount.

The first dynamic coefficient of friction is considered to reflect permeability of the electrolyte solution between the separator and the negative electrode plate. The separator is porous. A surface of the separator can have minute irregularities. A surface of the negative electrode plate can also have minute irregularities. It is considered that when the undulation of the surface of the negative electrode plate is large, frictional force between the separator and the negative electrode plate becomes large, with the result that the first dynamic coefficient of friction becomes large. It is considered that when the undulation of the surface of the negative electrode plate is large, spaces resulting from the irregularities are formed between the separator and the negative electrode plate. The spaces can serve as a permeation path for the electrolyte solution. As the first dynamic coefficient of friction is larger, the permeability of the electrolyte solution between the separator and the negative electrode plate tends to be improved. Since the permeability of the electrolyte solution between the separator and the negative electrode plate is improved, it is expected that the electrolyte solution is facilitated to return to inside of the electrode assembly when the electrode assembly absorbs the electrolyte solution. As a result, it is expected to reduce the precipitation of Li. This is presumably because unevenness is less likely to occur in the distribution of the electrolyte solution in the electrode assembly. However, if the permeability of the electrolyte solution is too high, the precipitation of Li or the like may be promoted conversely. That is, when the permeability of the electrolyte solution is too high, the electrolyte solution may be facilitated to flow out from the electrode assembly. Due to the electrolyte solution flowing out therefrom, shortage of the electrolyte solution may be promoted. When the first dynamic coefficient of friction is 0.52 to 0.66, the electrolyte solution can exhibit an appropriate degree of permeability between the separator and the negative electrode plate.

With synergy of the above effects, it is expected to reduce the precipitation of Li caused by long-term use in the present technology.

2. The negative electrode plate includes a negative electrode active material layer. The negative electrode active material layer is in contact with the first main surface. The negative electrode active material layer includes negative electrode active material particles. The negative electrode active material particles may have a median value of circularities of 0.60 to 0.85.

As the median value of the circularities is larger, it is indicated that the shapes of the negative electrode active material particles are closer to the spherical shape. The undulation of the surface of the negative plate may correspond to gaps between adjacent particles. When each of the negative electrode active material particles has an appropriate degree of roundness, the gaps tend to be deep. On the other hand, in the case where the median value of the circularities is small, the negative electrode active material particles are likely to be arranged so as to be laid in a plane direction of the negative electrode plate when the negative electrode plate or the electrode assembly is compressed and shaped. The "plane direction" represents a direction orthogonal to the thickness direction of the negative electrode plate. When the negative electrode active material particles are laid in the plane direction, the gaps between the adjacent particles tend to be shallow. When the median value of the circularities is 0.60 to 0.85, an appropriate degree of undulation can be formed in the surface of the negative electrode plate. Since the appropriate degree of undulation is presented in the surface of the negative electrode plate, the first dynamic coefficient of friction of 0.52 to 0.66 can be likely to be obtained.

3. The negative electrode active material layer has a strip-like planar shape. The electrode assembly may have an aspect ratio of 2.0 to 2.5.

The aspect ratio is calculated by the following formula (β):

$$R_2 = W/H_1 \qquad (\beta).$$

In the formula (β), $R_2$ represents the aspect ratio. W represents a length of the negative electrode active material layer in a width direction. $H_1$ represents the average length of the two line segments.

The width direction of the negative electrode active material layer corresponds to the width direction of the electrode assembly. The width direction of the electrode assembly can be parallel to the winding axis. The electrolyte solution can be ejected from both ends of the electrode assembly in the width direction. The both ends in the width direction are considered as outlets for the electrolyte solution.

The length of the negative electrode active material layer in the width direction is the "width dimension (W) of the flat portion". In the contour line of the electrode assembly, the length of the straight line portion (average length of the two line segments) is the "height dimension ($H_1$) of the flat portion". Therefore, the aspect ratio ($R_2$) is also considered as the aspect ratio of the flat portion.

As the aspect ratio ($R_2$) is larger, the center of the flat portion is relatively closer to the curved portion (buffer) with respect to the both ends (outlets) in the width direction when viewed from the center of the flat portion. Thus, an amount of electrolyte solution to move toward the buffer can be relatively larger than an amount of electrolyte solution to move toward the outlets. When the aspect ratio ($R_2$) is 2.0 to 2.5, shortage of the electrolyte solution caused by long-term use tends to be reduced. This is presumably because the electrolyte solution is less likely to flow out from the electrode assembly.

4. The second main surface is in contact with the positive electrode plate. A second dynamic coefficient of friction between the second main surface and the positive electrode plate may be 0.70 to 0.85.

It is considered that the second dynamic coefficient of friction reflects irregularities of the surface of the positive electrode plate. It is considered that as the second dynamic coefficient of friction is larger, the undulation of the surface of the positive electrode plate is larger. Since the undulation of the surface of the positive electrode plate is large, spaces can be formed between the positive electrode plate and the separator. The spaces between the separator and the positive electrode plate can also serve as a permeation path for the electrolyte solution. When the second dynamic coefficient of friction is 0.70 to 0.85, an initial resistance is expected to be small. Further, a resistance increase ratio after a charging/discharging cycle is also expected to be small. This is presumably because appropriate amounts of the electrolyte solution can be supplied to the surface of the positive electrode plate and the surface of the negative electrode plate.

5. The electrolyte solution may include methyl propionate.

The electrolyte solution including methyl propionate (MP) may have a low viscosity. Since the electrolyte solution has a low viscosity, the distribution of the electrolyte solution in the electrode assembly tends to be uniform. This is presumably because the permeation of the electrolyte solution is promoted. Further, since the electrolyte solution includes MP, it is expected to improve the initial resistance as well as the resistance increase ratio after the charging/discharging cycle.

The foregoing and other objects, features, aspects and advantages of the present technology will become more apparent from the following detailed description of the present technology when taken in conjunction with the accompanying drawings.

DESCRIPTION OF THE PREFERRED EMBODIMENTS

Figure 1:
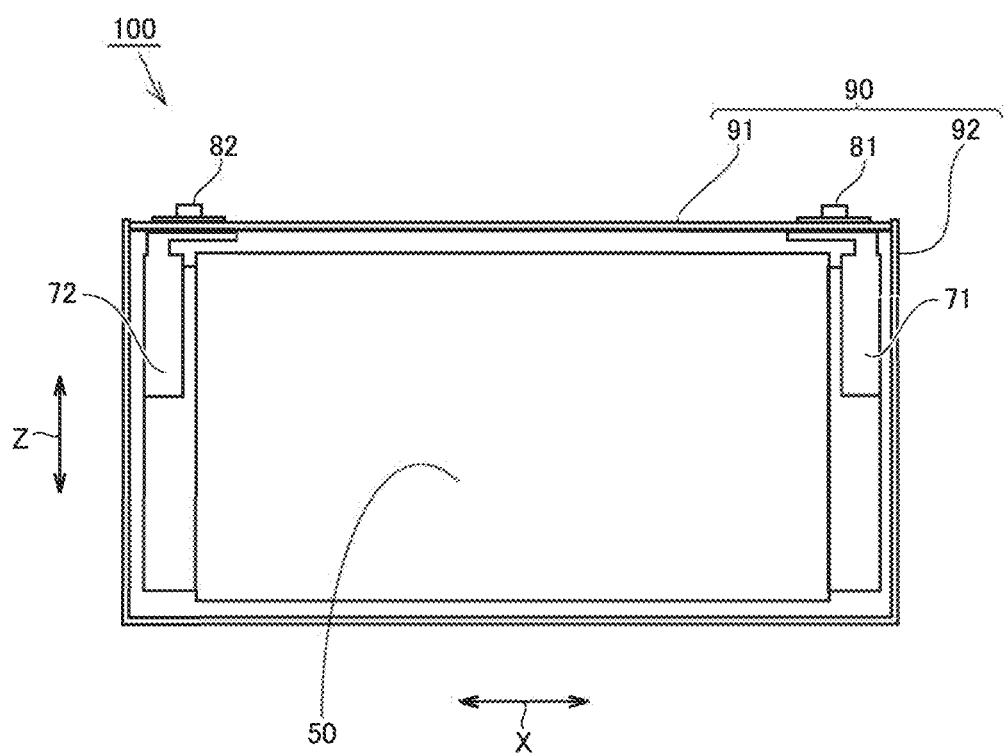
FIG. 1 is a schematic diagram showing an exemplary configuration of a nonaqueous electrolyte secondary battery in the present embodiment.

Hereinafter, an embodiment (also referred to as "the present embodiment" in the present specification) of the present technology will be described. However, the scope of the present technology is not restricted by the following description. For example, a description regarding functions and effects in the present specification does not limit the scope of the present technology to the scope in which all the functions and effects are exhibited.

Definitions of Terms Etc

In the present specification, expressions such as "comprise", "include", and "have" as well as their variants (such as "be composed of", "encompass", "involve", "contain", "carry", "support", and "hold") are open-end expressions. Each of the open-end expressions may or may not further include additional element(s) in addition to essential element(s). The expression "consist of" is a closed expression. The expression "consist essentially of" is a semi-closed expression. The semi-closed expression may further include additional element(s) in addition to essential element(s) as long as the object of the present technology is not compromised. For example, a normally conceivable element (such as an inevitable impurity) in the field to which the present technology belongs may be included as an additional element.

In the present specification, each of the words "may", "can", and the like is used in a permissible sense, i.e., "have a possibility to do", rather than in a mandatory sense, i.e., "must do".

In the present specification, elements expressed by singular forms ("a", "an", and "the") may include plural forms as well, unless otherwise stated particularly. For example, the term "particle" means not only "one particle" but also an "aggregate (powdery body, powder, particle group) of particles".

In the present specification, a numerical range such as "1 µm to 10 µm" and "1 to 10 µm" includes the lower and upper limit values unless otherwise stated particularly. That is, each of the expressions "1 µm to 10 µm" and "1 to 10 µm" represents a numerical range of "more than or equal to 1 µm and less than or equal to 10 µm". Further, numerical values freely selected from the numerical range may be employed as new lower and upper limit values. For example, a new numerical range may be set by freely combining a numerical value described in the numerical range with a numerical value described in another portion of the present specification, table, figure, or the like.

In the present specification, all the numerical values are modified by the term "about". The term "about" can mean, for example, ±5%, ±3%, ±1%, or the like. All the numerical values are approximate values that can be changed depending on a manner of use of the present technology. All the numerical values are indicated as significant figures. Each of all the measurement values or the like can be rounded off based on the number of digits of each significant figure. Each of all the numerical values may include an error resulting from a detection limit of a measurement apparatus or the like, for example.

Geometric terms in the present specification (for example, the terms such as "parallel", "perpendicular", and "orthogonal") should not be interpreted in a strict sense. For example, the term "parallel" may be deviated to some extent from the strict definition of the term "parallel". The geometric terms in the present specification can include, for example, a tolerance, an error, and the like in terms of design, operation, manufacturing, and the like. A dimensional relation in each of the figures may not coincide with an actual dimensional relation. In order to facilitate understanding of the present technology, the dimensional relation (length, width, thickness, or the like) in each figure may be changed. Further, part of configurations may be omitted.

In the present specification, when a compound is expressed by a stoichiometric composition formula such as "$LiCoO_2$", the stoichiometric composition formula merely indicates a representative example. The composition ratio may be non-stoichiometric. For example, when a lithium cobaltate is expressed as "$LiCoO_2$", the lithium cobaltate is not limited to a composition ratio of "Li/Co/O=1/1/2" unless otherwise stated particularly, and can include Li, Co, and O at any composition ratio. Further, doping, substitution, or the like with a small amount of element can be permitted.

Nonaqueous Electrolyte Secondary Battery

FIG. 1 is a schematic diagram showing an exemplary configuration of a nonaqueous electrolyte secondary battery in the present embodiment.

Battery 100 can be used for any purpose of use. Battery 100 may be used as a main electric power supply or a motive power assisting electric power supply in an electrically powered vehicle or the like, for example. A plurality of batteries 100 may be coupled to form a battery module or a battery pack. Battery 100 may have a rated capacity of 1 to 200 Ah, for example.

Battery 100 includes an exterior package 90. Exterior package 90 stores an electrode assembly 50 and an electrolyte solution (not shown). That is, battery 100 includes electrode assembly 50 and the electrolyte solution. For example, part of the electrolyte solution may be stored at the bottom portion of exterior package 90. Part of electrode assembly 50 may be immersed in the electrolyte solution. Electrode assembly 50 may be held in a pouch-shaped holder (not shown), for example.

Exterior package 90 may have any shape. Exterior package 90 may be a case composed of, for example, an aluminum (Al) alloy or the like. Exterior package 90 may be a pouch composed of an Al laminate film or the like, for example.

Exterior package 90 may have a prismatic shape (flat profile rectangular parallelepiped), for example. Exterior package 90 may include, for example, a sealing plate 91 and an exterior container 92. Sealing plate 91 closes the opening of exterior container 92. For example, sealing plate 91 and exterior container 92 may be joined to each other by laser processing.

A positive electrode terminal 81 and a negative electrode terminal 82 may be provided on sealing plate 91. Sealing plate 91 may be further provided with an injection opening (not shown), a gas discharge valve (not shown), and the like. The electrolyte solution can be injected from the injection opening to inside of exterior package 90. The injection opening can be closed by a sealing plug or the like, for example. Positive electrode current collecting member 71 connects positive electrode terminal 81 and electrode assembly 50 to each other. Positive electrode current collecting member 71 may be, for example, an Al plate or the like. Negative electrode current collecting member 72 connects negative electrode terminal 82 and electrode assembly 50 to each other. Negative electrode current collecting member 72 may be a copper (Cu) plate or the like, for example.

Figure 2:
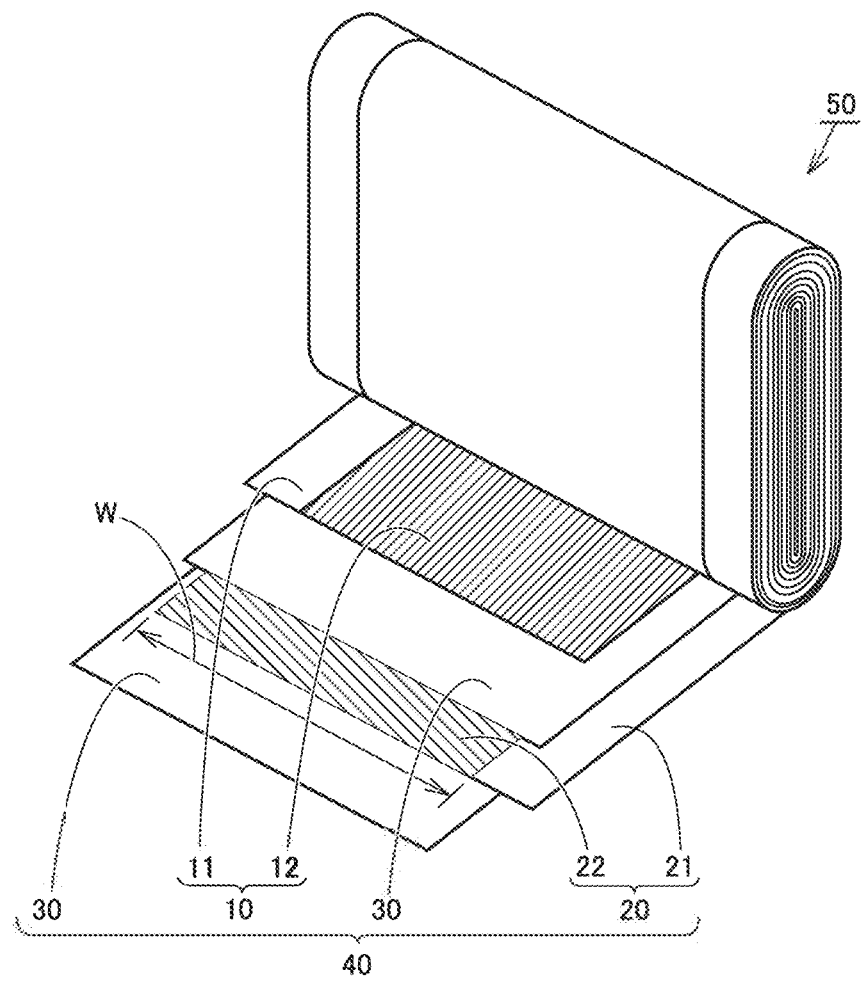
FIG. 2 is a schematic diagram showing an exemplary configuration of an electrode assembly in the present embodiment.

FIG. 2 is a schematic diagram showing an exemplary configuration of an electrode assembly in the present embodiment.

Electrode assembly 50 includes a laminated assembly 40. Electrode assembly 50 may consist essentially of laminated assembly 40. Laminated assembly 40 includes positive electrode plate 10, separator 30, and negative electrode plate 20. At least a portion of separator 30 is interposed between positive electrode plate 10 and negative electrode plate 20. Separator 30 separates positive electrode plate 10 and negative electrode plate 20 from each other. Laminated assembly 40 may include one separator 30 solely. Laminated assembly 40 may include two separators 30. For example, positive electrode plate 10 may be sandwiched between two separators 30. For example, negative electrode plate 20 may be sandwiched between two separators 30. Laminated assembly 40 may be formed by layering separator 30 (first separator), negative electrode plate 20, separator 30 (second separator), and positive electrode plate 10 in this order, for example. Each of positive electrode plate 10, negative electrode plate 20, and separator 30 can have a strip-like planar shape, for example.

Electrode assembly 50 is of a wound type. That is, laminated assembly 40 is spirally wound. For example, laminated assembly 40 may be wound around a winding core having a cylindrical shape to form a wound assembly having a tubular shape. By compressing the wound assembly having the tubular shape in the radial direction, electrode assembly 50 having a flat shape may be formed. A below-described height ratio ($R_1$) can be adjusted by, for example, the diameter of the winding core or the like. For example, as the diameter of the winding core is smaller, the height ratio ($R_1$) tends to be larger.

Figure 3:
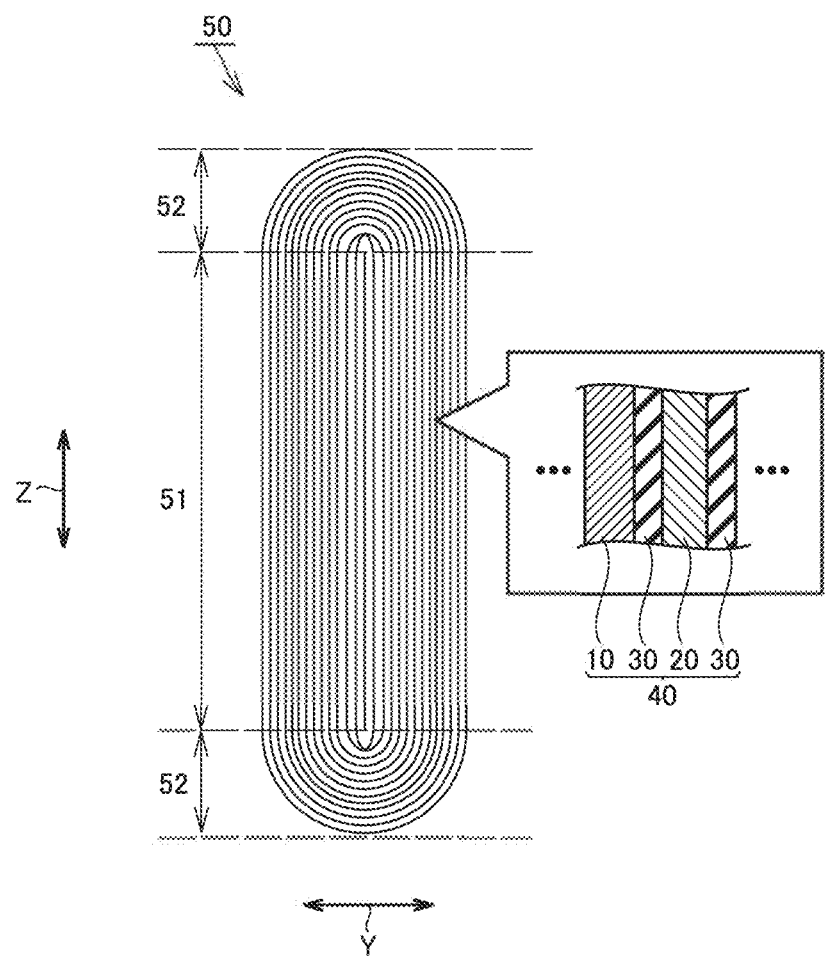
FIG. 3 is a schematic cross sectional view showing an exemplary configuration of the electrode assembly in the present embodiment.

FIG. 3 is a schematic cross sectional view showing an exemplary configuration of the electrode assembly in the present embodiment.

FIG. 3 shows a cross section orthogonal to a winding axis. Electrode assembly 50 includes a flat portion 51 and curved portions 52. In flat portion 51, laminated assembly 40 is flat. In each of curved portions 52, laminated assembly 40 is curved. Flat portion 51 is sandwiched between two curved portions 52. Flat portion 51 connects two curved portions 52 to each other. In each of curved portions 52, a space between the electrodes tends to be larger than that in flat portion 51.

Flat portion 51 may be a portion pressed by a shaping die during shaping. Curved portion 52 may be a portion that has not been brought into contact with the shaping die during the shaping. In the outermost periphery of electrode assembly 50, the thickness of separator 30 at flat portion 51 may be thinner than the thickness of separator 30 at curved portion 52. For example, a boundary between flat portion 51 and curved portion 52 can be specified by a change in the thickness of separator 30 in the outermost periphery.

(Number of Layers)

The number of the layers of each member represents the number of times a straight line extending across electrode assembly 50 in the radial direction of electrode assembly 50 (for example, Y axis direction of FIG. 3) intersects the member. The number of the layers of positive electrode plate 10 may be 60 to 80, for example. The number of layers of negative electrode plate 20 may be 60 to 80, for example. The number of layers of separator 30 may be 120 to 160, for example.

(Height Ratio)

Figure 4:
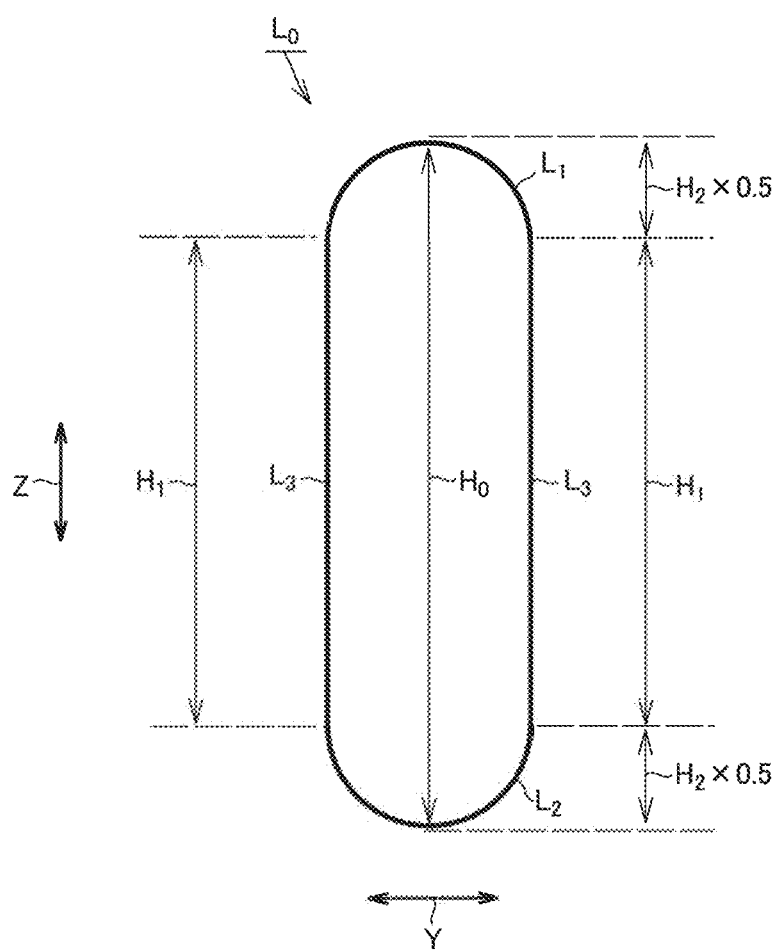
FIG. 4 is a schematic diagram showing an exemplary contour line of the electrode assembly in the present embodiment.

FIG. 4 is a schematic diagram showing an exemplary contour line of the electrode assembly in the present embodiment.

FIG. 4 shows a contour line of electrode assembly 50 of FIG. 3. Electrode assembly 50 has a contour line $L_0$ having a corner-rounded rectangular shape. Contour line $L_0$ includes a first arc-shaped portion $L_1$, a straight line portion $L_3$, and a second arc-shaped portion $L_2$.

Each of first arc-shaped portion $L_1$ and second arc-shaped portion $L_2$ is a contour line of curved portion 52. Each of first arc-shaped portion $L_1$ and second arc-shaped portion $L_2$ forms an arc. Each of first arc-shaped portion $L_1$ and second arc-shaped portion $L_2$ may be a circular arc, an elliptic arc, a semicircular arc, or a semi-elliptic arc.

Straight line portion $L_3$ is a contour line of flat portion 51. Straight line portion $L_3$ consists of two line segments. Each of the two line segments connects first arc-shaped portion $L_1$ and second arc-shaped portion $L_2$ to each other.

Contour line $L_0$ has a height ratio ($R_1$) of 1.20 to 1.35 (see the above-described formula (α)). The height ratio ($R_1$) is a ratio of the length ($H_0$) of the major axis to the average length ($H_1$) of the two line segments. The average length ($H_1$) is an arithmetic mean of the lengths of the two line segments constituting straight line portion $L_3$. The length ($H_0$) of the major axis is a distance between two points most distant from each other on contour line $L_0$. That is, the length ($H_0$) of the major axis is a distance between the tip of first arc-shaped portion $L_1$ and the tip of second arc-shaped portion $L_2$. Each of the tips represents a portion that protrudes the most in the height direction (Z axis direction). The length of each portion can be measured by, for example, a vernier caliper or the like. For example, a digital vernier caliper (constant pressure type) manufactured by Mitutoyo or the like, or a product equivalent thereto may be used. The length of each portion may be measured by, for example, an image dimension measuring instrument or the like.

When the height ratio ($R_1$) is 1.20 to 1.35, it is expected to reduce precipitation of Li caused by long-term use. This is presumably because curved portion 52 can function as a buffer for the electrolyte solution. Contour line $L_0$ may have a height ratio ($R_1$) of 1.21 to 1.30, a height ratio ($R_1$) of 1.22 to 1.28, or a height ratio ($R_1$) of 1.22 to 1.26, for example. Contour line $L_0$ may have a height ratio ($R_1$) of 1.20 to 1.24, or a height ratio ($R_1$) of 1.24 to 1.35, for example.

Separator

Separator 30 is a porous sheet. Separator 30 may have a thickness of, for example, 10 to 30 μm. Separator 30 may have an air permeability of 100 to 400 s/100 mL, for example. In the present specification, the "air permeability" represents "air resistance" defined in "JIS P 8117: 2009". The air permeability is measured by the Gurley test method.

Separator 30 is electrically insulative. Separator 30 may include, for example, a porous resin layer or the like. Separator 30 may consist essentially of a porous resin layer, for example. The porous resin layer may include, for example, a polyolefin or the like. The porous resin layer may include at least one selected from a group consisting of polyethylene (PE) and polypropylene (PP), for example. Separator 30 may have a single-layer structure, for example. Separator 30 may consist essentially of a PE layer, for example. Separator 30 may have a multilayer structure, for example. Separator 30 may be formed by layering a PP layer, a PE layer, and a PP layer in this order, for example. In addition to the porous resin layer, separator 30 may further include a porous ceramic layer or the like. For example, the porous ceramic layer may consist essentially of a binder having a mass fraction of 1 to 10% and a remainder of ceramic particles. The porous ceramic layer may be disposed on the outermost surface of separator 30, for example.

(Dynamic Coefficients of Friction)

Figure 5:
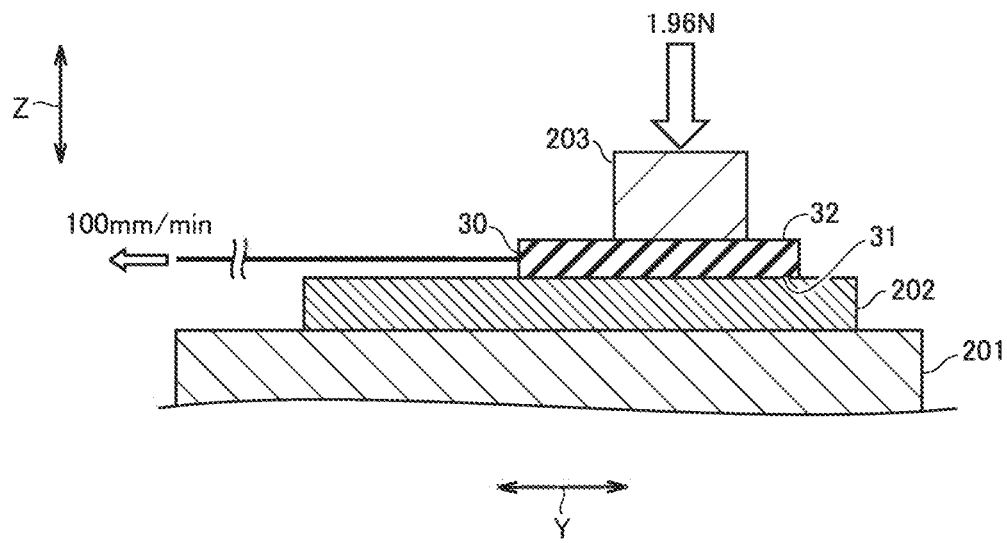
FIG. 5 is a schematic diagram showing a method of measuring dynamic coefficients of friction.

FIG. 5 is a schematic diagram showing a method of measuring dynamic coefficients of friction.

Separator 30 includes a first main surface 31 and a second main surface 32. First main surface 31 is a surface to be in contact with negative electrode plate 20. In electrode assembly 50, first main surface 31 is in contact with negative electrode active material layer 22. Second main surface 32 is a surface opposite to first main surface 31. Second main surface 32 is a surface to be in contact with positive electrode plate 10. In electrode assembly 50, second main surface 32 is in contact with positive electrode active material layer 12.

A first dynamic coefficient of friction between first main surface 31 and negative electrode plate 20 is 0.52 to 0.66. It is considered that the first dynamic coefficient of friction reflects the permeability of the electrolyte solution between separator 30 and negative electrode plate 20. When the first dynamic coefficient of friction is 0.52 to 0.66, the precipitation of Li caused by long-term use can be reduced. This is presumably because the electrolyte solution exhibits an appropriate degree of permeability. The first dynamic coefficient of friction may be 0.54 to 0.64, 0.56 to 0.62, or 0.58 to 0.60, for example. The first dynamic coefficient of friction may be 0.52 to 0.56 or 0.56 to 0.66, for example.

A second dynamic coefficient of friction between second main surface 32 and positive electrode plate 10 may be, for example, 0.70 to 0.85. It is considered that the second dynamic coefficient of friction reflects the permeability of the electrolyte solution between separator 30 and positive electrode plate 10. When the second dynamic coefficient of friction is 0.70 to 0.85, the initial resistance is expected to be small. Further, the resistance increase ratio after the charging/discharging cycle is also expected to be small. The second dynamic coefficient of friction may be, for example, 0.72 to 0.83, 0.74 to 0.81, or 0.76 to 0.79. The second dynamic coefficient of friction may be 0.70 to 0.72 or 0.72 to 0.85, for example.

Each of the dynamic coefficients of friction can be measured in accordance with the following procedure.

Battery 100 is prepared. Battery 100 is completely discharged. In a dry box, battery 100 (exterior package 90) is opened. Electrode assembly 50 is collected from battery 100. Electrode assembly 50 is disassembled to collect positive electrode plate 10, separator 30, and negative electrode plate 20. A first sample piece is cut out from negative electrode plate 20. The first sample piece can be cut out from a portion at which negative electrode active material layer 22 is not detached from negative electrode substrate 21. The first sample piece can be cut out from a portion corresponding to curved portion 52, for example.

A second sample piece is cut out from positive electrode plate 10. The second sample piece is cut out from a portion at which positive electrode active material layer 12 is not detached from positive electrode substrate 11. The second sample piece can be cut out from a portion corresponding to curved portion 52, for example.

A third sample piece is cut out from separator 30. The third sample piece is cut out from a portion in which pores are not blocked by the positive electrode active material particles, the negative electrode active material particles, and the like. The third sample piece can be cut out from a portion corresponding to curved portion 52, for example.

The electrolyte solution adhered to each sample piece is washed away by dimethyl carbonate (DMC). Each of the sample pieces is dried in the dry box. After the drying, each of the sample pieces is removed from the dry box.

A testing apparatus is prepared (see FIG. 5). The testing apparatus complies with "JIS K 7125: 1999". The third sample piece (separator 30) is cut into a planar size of, for example, 80 mm×200 mm. A counterpart material 202 is fixed to a surface of a testing table 201. Counterpart material 202 can be fixed by, for example, an adhesive tape or the like. Counterpart material 202 is the first sample piece (negative electrode plate 20). Counterpart material 202 has a planar size sufficiently larger than that of the third sample piece. The third sample piece is placed on counterpart material 202 to bring counterpart material 202 and first main surface 31 into contact with each other. A slide piece 203 is placed on the third sample piece. On this occasion, the first sample piece (negative electrode plate 20) and the third sample piece (separator 30) are placed to face each other such that at least the regions cut out from curved portion 52 are pressed. Slide piece 203 has a planar size of 63 mm×63 mm. The bottom surface (surface to be in contact with the third sample piece) of slide piece 203 is covered with, for example, a felt. The mass of slide piece 203 is 200 g±2 g. The third sample piece is pulled in parallel with the friction surface. A test speed is 100 mm/min±10 mm/min. Test force required to move the third sample piece at the test speed is measured. The test force can be measured by a load cell (not shown). It should be noted that the sizes of the first to third sample pieces in the present specification are exemplary. The sizes of the first to third sample pieces can be set to appropriate sizes in accordance with the sizes of the electrode plate, separator 30, electrode assembly 50, curved portion 52, and the like, for example. Since each of the first to third sample pieces at least has a size larger than that of slide piece 203, it is considered possible to measure the coefficient of friction.

Figure 6:
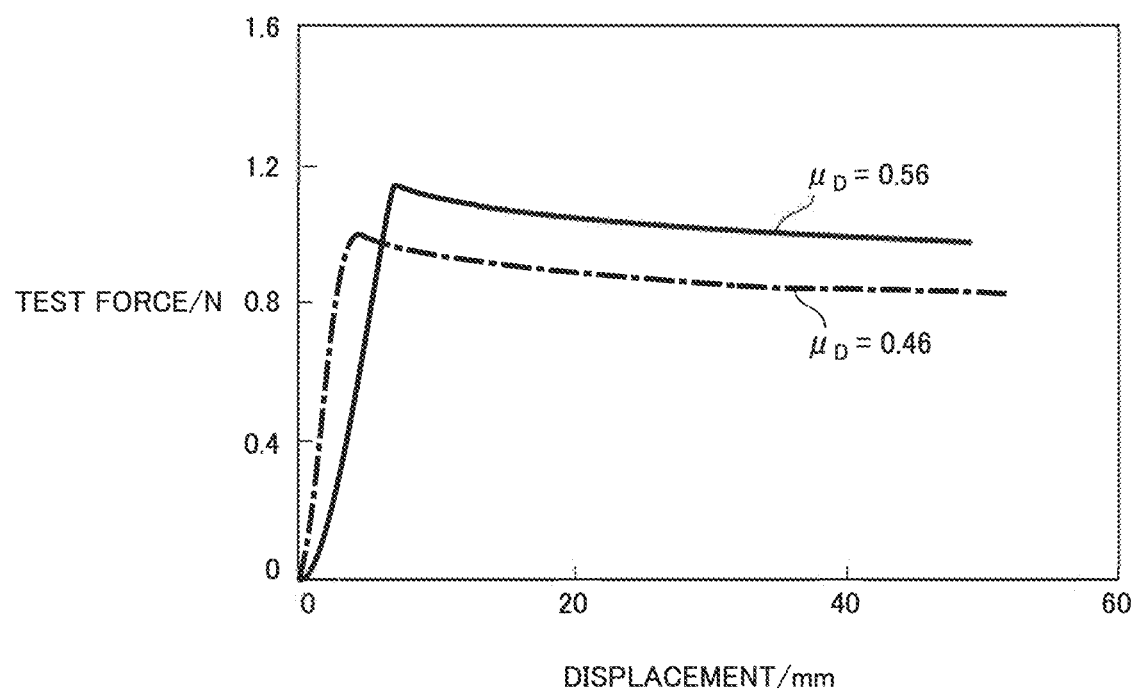
FIG. 6 is a graph showing an exemplary measurement result of a first dynamic coefficient of friction.

FIG. 6 is a graph showing an exemplary measurement result of the first dynamic coefficient of friction.

The test force is plotted with respect to displacement of the third sample piece. Immediately after the start of the test, the test force can be increased linearly. The test force reaches a maximum value. The test force is gradually decreased after reaching the maximum value.

The dynamic coefficient of friction is calculated by the following formula (γ):

$$\mu_D = F_D/F_P \quad (\gamma).$$

In the formula (γ), $\mu_D$ represents the dynamic coefficient of friction. $F_D$ represents the average of the test force in a range of displacement of 10 to 30 mm. $F_P$ represents a normal force (1.96 N) caused by the mass of slide piece 203. The first dynamic coefficient of friction is measured five times. The arithmetic mean of the five measurement values is employed.

The second dynamic coefficient of friction can be measured in the same manner as the first dynamic coefficient of friction except that counterpart material 202 is changed to the second sample piece (positive electrode plate 10) and the third sample piece (separator 30) is placed on counterpart material 202 to bring counterpart material 202 and second main surface 32 into contact with each other.

Negative Electrode Plate

Negative electrode plate 20 includes a negative electrode active material layer 22 (see FIG. 2). Negative electrode plate 20 may consist essentially of negative electrode active material layer 22. Negative electrode plate 20 may further include a negative electrode substrate 21, for example. For example, negative electrode active material layer 22 may be disposed on a surface of negative electrode substrate 21. Negative electrode active material layer 22 may be disposed only on one surface of negative electrode substrate 21. Negative electrode active material layer 22 may be disposed on each of both front and rear surfaces of negative electrode substrate 21. Negative electrode substrate 21 is an electrically conductive sheet. Negative electrode substrate 21 may include, for example, a pure Cu foil, a Cu alloy foil, or the like. Negative electrode substrate 21 may have a thickness of, for example, 5 to 30 μm. Negative electrode substrate 21 may be exposed at one end portion in the width direction of negative electrode plate 20 (Y axis direction in FIG. 2). Negative electrode current collecting member 72 can be joined to the exposed portion of negative electrode substrate 21 (see FIG. 1).

Negative electrode active material layer 22 may have a thickness of 10 to 150 μm or may have a thickness of 50 to 100 μm, for example. Negative electrode active material layer 22 may have a density of 0.5 to 2.0 g/cm³ or may have a density of 1.0 to 1.5 g/cm³, for example. The density of negative electrode active material layer 22 is calculated by dividing the mass of negative electrode active material layer 22 by the apparent volume of negative electrode active material layer 22. The apparent volume includes the volume of voids in negative electrode active material layer 22.

(Aspect Ratio)

Negative electrode active material layer 22 has a strip-like planar shape (see FIG. 2). Electrode assembly 50 may have an aspect ratio of 2.0 to 2.5, for example. The aspect ratio ($R_2$) is a ratio of the width dimension (W) of flat portion 51 to the height dimension ($H_1$) of flat portion 51 (see FIGS. 2 and 4). The width dimension (W) corresponds to the length of negative electrode active material layer 22 in the width direction. When the aspect ratio ($R_2$) is 2.0 to 2.5, shortage of the electrolyte solution caused by long-term use tends to be reduced. The aspect ratio ($R_2$) may be 2.1 to 2.4 or 2.2 to 2.4, for example. The aspect ratio ($R_2$) may be 2.0 to 2.1 or 2.1 to 2.5, for example.

(Negative Electrode Active Material Particles)

Negative electrode active material layer 22 is in contact with first main surface 31 of separator 30. Negative electrode active material layer 22 includes negative electrode active material particles. Negative electrode active material layer 22 may consist essentially of the negative electrode active material particles. The negative electrode active material particles may include at least one selected from a group consisting of natural graphite, artificial graphite, silicon, silicon oxide, tin, tin oxide, and $Li_4Ti_5O_{12}$, for example. The negative electrode active material particles may be composite particles, for example. The negative electrode active material particles may include, for example, substrate particles and coating films. The coating films can coat the surfaces of the substrate particles. The substrate particles may include natural graphite or the like, for example. The coating films may include, for example, amorphous carbon or the like.

Each of the negative electrode active material particles can have any shape. The negative electrode active material particle may have a spherical shape, a lump-like shape, a flake-like shape, or the like, for example. Each of the negative electrode active material particles may be, for example, spherical graphite or the like. The shapes of the negative electrode active material particles can be reflected in the irregularities of the surface of negative electrode active material layer 22. Since each of the negative electrode active material particles has a shape approximate to the spherical shape in negative electrode active material layer 22 having been compressed, gaps between the particles tend to be deep. As a result, the first dynamic coefficient of friction is expected to be large. The shape of each of the negative electrode active material particles in negative electrode active material layer 22 having been compressed can be evaluated in accordance with a circularity, for example.

(Circularity)

The circularity can be measured in accordance with the following procedure. A test piece having a predetermined size is cut out from negative electrode plate 20 having been compressed. The test piece is buried in a resin material. By cutting the buried test piece, a cross sectional sample of negative electrode active material layer 22 is produced. The cross sectional sample includes a cross section perpendicular to the surface of negative electrode active material layer 22. The cross sectional sample is subjected to a cleaning process (ion milling process). After the cleaning, a cross sectional SEM image is obtained by observing the cross sectional sample using a SEM (scanning electron microscope). In the cross sectional SEM image, 30 negative electrode active material particles are randomly extracted. The respective circularities of the 30 negative electrode active material particles are measured. The median value is calculated from the 30 circularities.

The circularity of each particle is calculated by the following formula (δ):

$$C=4\pi S/P^2 \quad (\delta)$$

In the formula (δ), "C" represents the circularity. "S" represents the area of the cross sectional image of the particle. "P" represents the peripheral length (length of the contour line) of the cross sectional image of the particle. The circularity of a true circle is 1.

The median value of circularities may be 0.60 to 0.85, for example. When the median value of the circularities is 0.60 to 0.85, an appropriate degree of undulation is expected to be formed at the surface of negative electrode active material layer 22. The medium value of the circularities may be 0.65 to 0.80 or may be 0.70 to 0.80, for example. The medium value of the circularities may be 0.60 to 0.76 or may be 0.76 to 0.85, for example.

(Particle Size)

The negative electrode active material particles may have a D50 of 5 to 20 μm, may have a D50 of 9.5 to 15 μm, or may have a D50 of 10 to 12 μm, for example. In the present specification, "D50" is defined as a particle diameter corresponding to a cumulative frequency of 50% from the smallest particle diameter in a volume-based particle size distribution. The volume-based particle size distribution can be measured by a laser diffraction type particle size distribution measurement apparatus. Examples thereof usable herein may include: a laser diffraction type particle size distribution measurement apparatus with the product name "SALD-2200" as provided by Shimadzu Corporation; or a product equivalent to the foregoing apparatus.

The negative electrode active material particles may have an arithmetic mean diameter of 5 to 20 μm, may have an arithmetic mean diameter of 9.5 to 15 μm, or may have an arithmetic mean diameter of 10 to 12 μm, for example. The "arithmetic mean diameter" in the present specification can be measured in negative electrode active material layer 22 having been compressed. In the cross sectional SEM image, the respective diameters of the 30 negative electrode active material particles are measured. The diameter of each negative electrode active material particle represents a distance between two points most distant from each other on the contour line of the negative electrode active material particle. The arithmetic mean of the 30 diameters is regarded as the arithmetic mean diameter. Depending on a method of producing negative electrode plate 20, the D50 and the arithmetic mean diameter may be different from each other or the D50 and the arithmetic mean diameter may be substantially the same.

(Optional Components)

Negative electrode active material layer 22 may further include a conductive material, a binder, and the like in addition to the negative electrode active material particles. For example, negative electrode active material layer 22 may consist essentially of 0 to 10% of the conductive material in mass fraction, 0.1 to 10% of the binder in mass fraction, and a remainder of the negative electrode active material particles. The conductive material can include any component. The conductive material may include, for example, carbon black, carbon nanotube, or the like. The binder can include any component. The binder may include, for example, at least one selected from a group consisting of carboxymethyl cellulose (CMC) and styrene-butadiene rubber (SBR).

Positive Electrode Plate

Positive electrode plate 10 may include positive electrode substrate 11 and positive electrode active material layer 12, for example (see FIG. 2). Positive electrode substrate 11 is an electrically conductive sheet. Positive electrode substrate 11 may include, for example, a pure Al foil, an Al alloy foil, or the like. Positive electrode substrate 11 may have a thickness of 10 to 30 μm, for example. Positive electrode substrate 11 may be exposed at one end portion in the width direction of positive electrode plate 10 (Y axis direction in FIG. 2). Positive electrode current collecting member 71 can be joined to the exposed portion of positive electrode substrate 11 (see FIG. 1).

Positive electrode active material layer 12 may be disposed only on one surface of positive electrode substrate 11. Positive electrode active material layer 12 may be disposed on each of the front and rear surfaces of positive electrode substrate 11. Positive electrode active material layers 12 may have a thickness of 10 to 150 μm or may have a thickness of 50 to 100 μm, for example.

Positive electrode active material layer 12 is in contact with second main surface 32 of separator 30. Positive electrode active material layer 12 includes positive electrode active material particles. The positive electrode active material particles may have an arithmetic mean diameter of 1 to 30 μm, for example. The positive electrode active material particles can include any components. For example, each of the positive electrode active material particles may include at least one selected from a group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. For example, in a composition formula such as "$Li(NiCoMn)O_2$", the total of the composition ratios in the parentheses is 1. That is, the relation of "$C_{Ni}+C_{Co}+C_{Mn}=1$" is satisfied. For example, "$C_{Ni}$" represents the composition ratio of Ni. The composition ratio of each component is arbitrary as long as the total of the composition ratios is 1.

In addition to the positive electrode active material particles, positive electrode active material layer 12 may further include a conductive material, a binder, or the like, for example. For example, positive electrode active material layer 12 may consist essentially of 0.1 to 10% of the conductive material in mass fraction, 0.1 to 10% of the binder in mass fraction, and a remainder of the positive electrode active material particles. The conductive material may include acetylene black or the like, for example. The binder can include any component. For example, the binder may include polyvinylidene difluoride (PVdF) or the like.

Electrolyte Solution

The electrolyte solution is a liquid electrolyte. The electrolyte solution includes a solvent and a supporting electrolyte. The solvent is aprotic. The solvent can include any component. The solvent may include at least one selected from a group consisting of a carbonate ester, a carboxylic acid ester, an ether, and a lactone, for example. For example, the solvent may consist essentially of the carbonate ester. For example, the solvent may include the carbonate ester and the carboxylic acid ester. A blending amount of the carboxylic acid ester may be, for example, 0.1 to 50 parts by volume, 1 to 10 parts by volume, or 1 to 5 parts by volume with respect to 100 parts by volume of the carbonate ester.

The carbonate ester may include at least one selected from a group consisting of ethylene carbonate (EC), propylene carbonate (PC), butylene carbonate (BC), dimethyl carbonate (DMC), ethyl methyl carbonate (EMC), and diethyl carbonate (DEC), for example.

The carboxylic acid ester may include at least one selected from a group consisting of methyl formate (MF), methyl acetate (MA), and methyl propionate (MP), for example. That is, the electrolyte solution may include MP. The electrolyte solution including MP can have a low viscosity. Since the electrolyte solution includes MP, distribution of the electrolyte solution in electrode assembly 50 tends to be likely to be uniform. Further, since the electrolyte solution includes MP, it is expected to improve the initial resistance as well as the resistance increase ratio after the charging/discharging cycle.

The ether may include 1,2-dimethoxyethane (DME), 1,4-dioxane (DOX), tetrahydrofuran (THF), or the like, for example. The lactone may include γ-butyrolactone (GBL), δ-valerolactone, or the like, for example.

The supporting electrolyte is dissolved in the solvent. For example, the supporting electrolyte may include at least one selected from a group consisting of $LiPF_6$, $LiBF_4$, and $LiN(FSO_2)_2$. The supporting electrolyte may have a molar concentration of 0.5 to 2.0 mol/L or may have a molar concentration of 0.8 to 1.2 mol/L, for example.

The electrolyte solution may further include any additive in addition to the solvent and the supporting electrolyte. For example, the electrolyte solution may include the additive having a mass fraction of 0.01 to 5%. The additive may include, for example, at least one selected from a group consisting of vinylene carbonate (VC), lithium difluorophosphate ($LiPO_2F_2$), lithium fluorosulfonate ($FSO_3Li$), and lithium bis[oxalatoborate] (LiBOB).

EXAMPLES

Hereinafter, an example of the present technology (also referred to as "the present example" in the present specification) will be described. However, the scope of the present technology is not restricted by the following description.

Production of Battery

Test batteries (nonaqueous electrolyte secondary batteries) according to No. 1 to No. 14 were produced as follows.
The design dimension and the like of each portion are as follows.

Design Dimension, Etc

Rated capacity: 4 Ah
Material of the exterior package: Al alloy
Outer dimension of the exterior package: width of 120 mm×depth of 12.5 mm×height of 65 mm
Outer dimension of the electrode assembly: width of 116 mm×depth of 10.5 mm×height of 58 mm
Positive electrode plate: width dimension of 105 mm
Positive electrode active material layer: width dimension of 90 mm
Number of layers of the positive electrode plate: 66
Negative electrode plate: width dimension of 107 mm
Negative electrode active material layer: width dimension of 95 mm
Number of layers of the negative electrode plate: 68
Separator: width dimension of 100 mm In the present example, the width dimension represents a dimension in the X axis direction of FIG. 1 or the like. The depth dimension represents a dimension in the Y axis direction in FIG. 2 or the like. The height dimension represents a dimension in the Z axis direction in FIG. 1 or the like.

Production of Positive Electrode Plate

The following materials were prepared.
Positive electrode active material particles: Li(NiCoMn)$O_2$
Conductive material: acetylene black
Binder: PVdF
Dispersion medium: N-methyl-2-pyrrolidone
Positive electrode substrate: Al alloy foil By mixing the positive electrode active material particles, the conductive material, the binder, and the dispersion medium, a positive electrode slurry was prepared. The positive electrode slurry was applied onto each of the front and rear surfaces of the positive electrode substrate and was dried, thereby forming a positive electrode active material layer. Thus, a positive electrode raw sheet was produced. The positive electrode raw sheet was compressed. After the compression, the positive electrode raw sheet is cut in the form of a strip, thereby producing the positive electrode plate.

The width dimension of the positive electrode plate was 105 mm. The width dimension of the positive electrode active material layer was 90 mm. The positive electrode substrate was exposed for 15 mm at one end of the positive electrode plate in the width direction.

Production of Negative Electrode Plate

The following materials were prepared.
Negative electrode active material particles: spheroidized natural graphite
Binder: CMC, SBR
Dispersion medium: water
Negative electrode substrate: Cu alloy foil DSO of the negative electrode active material particles was measured. D50 is shown in Tables 1 and 2 below.

By mixing the negative electrode active material particles, the binder, and the dispersion medium, a negative electrode slurry was prepared. The negative electrode slurry was applied onto each of the front and rear surfaces of the negative electrode substrate and was dried, thereby forming a negative electrode active material layer. Thus, a negative electrode raw sheet was produced. The negative electrode raw sheet was compressed. After the compression, the negative electrode raw sheet was cut in the form of a strip, thereby producing the negative electrode plate.

The width dimension of the negative electrode plate was 107 mm. The width dimension of the negative electrode active material layer was 95 mm. The negative electrode substrate was exposed for 12 mm at one end of the negative electrode plate in the width direction.

In the negative electrode plate, the median value of circularities of the negative electrode active material particles was measured in accordance with the procedure described above. The medium value of the circularities is shown in Tables 1 and 2 below.

Preparation of Separator

A separator was prepared. The separator consisted of a porous resin layer. The porous resin layer consisted of polyolefin.

Formation of Electrode Assembly

The separator, the positive electrode plate, the separator, and the negative electrode plate were layered in this order to form a laminated assembly. The laminated assembly was wound around a winding core to form a wound assembly having a tubular shape. The wound assembly was pressed and collapsed in a direction orthogonal to the winding axis, thereby forming the wound assembly into a flat shape. In this way, an electrode assembly was formed. In the present example, the height ratio ($R_1$) was adjusted by the diameter of the winding core.

By measuring the dimension of each portion in the electrode assembly, the height ratio ($R_1$) and the aspect ratio ($R_2$) were calculated. The height ratio ($R_1$) and the aspect ratio ($R_2$) are shown in Tables 1 and 2 below.

(Injection of Electrolyte Solution)

The electrode assembly was stored in the exterior package. An electrolyte solution was injected into the exterior package. After the injection of the electrolyte solution, the electrode assembly was sufficiently immersed in the electrolyte solution. After the immersion, a predetermined amount of charging was performed. Gas generated from the electrode assembly during the charging was ejected from the exterior package. After the ejection of the gas, the exterior package was sealed. In this way, a battery was manufactured. In each of the test batteries according to No. 1 to No. 13, an electrolyte solution including the following components was used.

Solvent: "EC/EMC/DMC=30/35/35 (volume ratio)"
Supporting electrolyte: LiPF$_6$ (1 mol/L)
Additive: VC (0.3% in mass fraction)

In the test battery according to No. 14, an electrolyte solution including the following components was used.

Solvent: "EC/EMC/DMC/MP=28/34/35/3 (volume ratio)"
Supporting electrolyte: LiPF$_6$ (1 mol/L)
Additive: VC (0.3% in mass fraction)

Evaluations on Permeability

The battery was prepared which was left for 2.0 hours after the injection of the electrolyte solution. The battery was opened in a dry box to collect the electrode assembly. The electrode assembly was disassembled from the outermost peripheral side of the electrode assembly. Whenever one winding (one layer) of the laminated assembly was disassembled, it was visually confirmed whether or not the separator was wetted by the electrolyte solution. A portion wetted by the electrolyte solution and a portion not wetted by the electrolyte solution were discriminated from each other by a difference in surface color.

While the time of leaving after the injection of the electrolyte solution was extended in units of 0.5 hours, it was confirmed to what extent the separator was wetted. Each of values shown in the column "Permeability of Electrolyte Solution, Immersion Time" in Tables 1 and 2 below indicate a time at which the entire perimeter of the separator was confirmed to be wet. As the immersion time is shorter, it is considered that the permeability of the electrolyte solution is more excellent.

Coefficients of Friction

After the completion of the battery, the battery was opened in the dry box to collect the electrode assembly. The first dynamic coefficient of friction and the second dynamic coefficient of friction were measured in accordance with the procedure described above. The first dynamic coefficient of friction and the second dynamic coefficient of friction are shown in Tables 1 and 2 below.

Initial Resistance

Under a temperature environment of 25° C., the SOC (state of charge) of the battery was adjusted to 50% by constant current-constant voltage (CC-CV) charging. A current during constant current (CC) charging was 1 It. A total charging time was 1.5 hours. "1 It" is defined as a current by which the rated capacity of the battery is fully discharged in one hour. At the SOC of 50%, the battery had a voltage of 3.69 V. After the SOC was adjusted, a rest was taken for 30 minutes, and the battery was discharged by a current of 180 A for 10 seconds. The initial discharging resistance (initial resistance) was calculated by the following formula:

$$r=(V_0-V_{10})/180.$$

In the formula, r represents the discharging resistance. $V_0$ represents a voltage at the start of discharging. $V_{10}$ represents a voltage 10 seconds after the start of discharging. It should be noted that each of the initial resistances in Tables 1 and 2 below is a relative value. The initial resistance of No. 1 is defined as 100.

Resistance Increase Ratio

After the initial resistance was measured, the SOC of the battery was adjusted to 80% by CC-CV charging under a temperature environment of 25° C. The current during the CC charging was 1 It. A total charging time was 1.5 hours. After the SOC was adjusted, a cycle test was performed under a temperature environment of 25° C. That is, discharging and charging were alternately repeated for 1200 hours in the following manner.

Discharging: current=1 It, discharging capacity=capacity corresponding to 20% SOC
Charging: current=1 It, charging capacity=capacity corresponding to 20% SOC After the cycle test, the discharging resistance after the cycle (post-cycle resistance) was measured in the same manner as the initial resistance. The resistance increase ratio (percentage) was calculated by dividing the post-cycle resistance by the initial resistance. The resistance increase ratio is shown in Tables 1 and 2 below.

Precipitation of Li

After the cycle test, the battery was opened in the dry box to collect the electrode assembly. The electrode assembly was disassembled from the outermost peripheral side of the electrode assembly. Whenever one winding (one layer) of the laminated assembly was disassembled, it was visually confirmed whether or not Li was precipitated on the surface of the negative electrode plate. A portion at which Li was precipitated and a portion at which Li was not precipitated were discriminated from each other by a difference in surface color. In the column "Precipitation of Li" in Tables 1 and 2, "OK" indicates that precipitation of Li was not confirmed in the entire perimeter. "NG" indicates that precipitation of Li was partially confirmed.

from the electrode assembly. With the shortened immersion time, it is expected to improve productivity.

In each of Tables 1 and 2, when the second dynamic coefficient of friction is 0.70 to 0.85, it is observed that the initial resistance tends to be small (see No. 10 to No. 13).

TABLE 1

|  |  | No. | | | | | | | | |
|---|---|---|---|---|---|---|---|---|---|---|
|  |  | 1 | 2 | 3 | 4 | 5 | 6 | 7 | 8 | 9 |
| First Dynamic Coefficient of Friction (Separator vs. Negative Electrode Plate) | /— | 0.56 | 0.56 | 0.56 | 0.52 | 0.66 | 0.56 | 0.56 | 0 50 | 0.70 |
| Second Dynamic Coefficient of Friction (Separator vs. Positive Electrode Plate) | /— | 0.72 | 0.72 | 0.72 | 0.72 | 0.72 | 0.72 | 0.72 | 0.72 | 0.72 |
| Negative Electrode Active Material Particles Circularity, Median Value (n = 30) | /— | 0.76 | 0.76 | 0.76 | 0.60 | 0.85 | 0.76 | 0.76 | 0.55 | 0.87 |
| Negative Electrode Active Material Particles D50 | /μm | 11.0 | 11.0 | 11.0 | 10.9 | 11.1 | 11.0 | 11.0 | 11.0 | 11.3 |
| Electrode Assembly Height Ratio ($R_1 = H_0/H_1$) | /— | 1.24 | 1.20 | 1.35 | 1.24 | 1.24 | 1.15 | 1.38 | 1.24 | 1.24 |
| Electrode Assembly Aspect Ratio ($R_2 = W/H_1$) | /— | 2.1 | 2.1 | 2.1 | 2.1 | 2.1 | 2.1 | 2.1 | 2.1 | 2.1 |
| Permeability of Electrolyte Solution, Immersion Time | /h | 2.5 | 2.5 | 2.5 | 3.0 | 2.0 | 4.0 | 2.0 | 4.0 | 2.0 |
| Initial Resistance | /— | 100 | 99 | 102 | 104 | 103 | 113 | 110 | 112 | 108 |
| Resistance Increase Ratio | /% | 110 | 115 | 111 | 120 | 119 | 139 | 132 | 134 | 142 |
| Precipitation of Li |  | OK | OK | OK | OK | OK | NG | NG | NG | NG |

TABLE 2

|  |  | No. | | | | |
|---|---|---|---|---|---|---|
|  |  | 10 | 11 | 12 | 13 | 14 |
| First Dynamic Coefficient of Friction (Separator vs. Negative Electrode Plate) | /— | 0.56 | 0.56 | 0.56 | 0.56 | 0.56 |
| Second Dynamic Coefficient of Friction (Separator vs. Positive Electrode Plate) | /— | 0.70 | 0.85 | 0.65 | 0.88 | 0.72 |
| Negative Electrode Active Material Particles Circularity, Median Value (n = 30) | /— | 0.76 | 0.76 | 0.76 | 0.76 | 0.76 |
| Negative Electrode Active Material Particles D50 | /μm | 11.0 | 11.0 | 11.0 | 11.0 | 11.0 |
| Electrode Assembly Height Ratio ($R_1 = H_0/H_1$) | /— | 1.24 | 1.24 | 1.24 | 1.24 | 1.24 |
| Electrode Assembly Aspect Ratio ($R_2 = W/H_1$) | /— | 2.1 | 2.1 | 2.1 | 2.1 | 2.1 |
| Permeability of Electrolyte Solution, Immersion Time | /h | 2.5 | 2.5 | 3.0 | 2.5 | 2.5 |
| Initial Resistance | /— | 101 | 105 | 109 | 108 | 100 |
| Resistance Increase Ratio | /% | 111 | 111 | 120 | 124 | 107 |
| Precipitation of Li |  | OK | OK | OK | OK | OK |

Results

In each of Tables 1 and 2, when the height ratio ($R_1$) is 1.20 to 1.35 and the first dynamic coefficient of friction is 0.52 to 0.66, it is observed that precipitation of Li after the cycle test tends to be reduced (see No. 1 to No. 9). This is presumably because shortage of the electrolyte solution is less likely to occur in the electrode assembly and distribution of the electrolyte solution in the electrode assembly is likely to be uniform.

When the height ratio ($R_1$) is 1.20 to 1.35 and the first dynamic coefficient of friction is 0.52 to 0.66, it is also observed that the resistance increase ratio tends to be small. This is presumably due to the following reason: since an amount of movement of the electrolyte solution is large, the electrolyte solution is likely to be stirred, with the result that the concentration of the supporting electrolyte is less likely to be uneven.

When the height ratio ($R_1$) is 1.20 to 1.35 and the first dynamic coefficient of friction is 0.52 to 0.66, it is also observed that the immersion time tends to be short. The immersion time was shortened presumably because the electrolyte solution is likely to be permeated into the electrode assembly and gas bubbles are likely to be released Further, it is also observed that the resistance increase ratio tends to be small. Further, since the electrolyte solution includes MP, it is also observed that the initial resistance and the resistance increase ratio tend to be improved (see No. 10 and No. 14).

The present embodiment and the present example are illustrative in any respects. The present embodiment and the present example are not restrictive. The scope of the present technology includes any modifications within the scope and meaning equivalent to the terms of the claims. For example, it is initially expected to extract freely configurations from the present embodiment and the present example and combine them freely.

What is claimed is:

1. A nonaqueous electrolyte secondary battery comprising:
   an exterior package;
   an electrode assembly; and
   an electrolyte solution, wherein
   the exterior package accommodates the electrode assembly and the electrolyte solution,
   the electrode assembly includes a laminated assembly,
   the laminated assembly includes a positive electrode plate, a separator, and a negative electrode plate, the separator separates the positive electrode plate and the negative electrode plate from each other, the laminated assembly is spirally wound, in a cross section orthogonal to a winding axis of the laminated assembly, the electrode assembly has a contour line having a corner-rounded rectangular shape, the contour line consists of a first arc-shaped portion, a straight line portion, and a second arc-shaped portion, the straight line portion consists of two line segments, the straight line portion connects the first arc-shaped portion and the second arc-shaped portion to each other, the contour line has a height ratio of 1.20 to 1.35, the height ratio is calculated by the following formula (α):

$$R_1 = H_0/H_1 \qquad (\alpha),\ \text{where}$$

$R_1$ represents the height ratio, $H_0$ represents a distance between two points most distant from each other on the contour line, and $H_1$ represents an average length of the two line segments, the separator includes a first main surface and a second main surface, the first main surface is in contact with the negative electrode plate, and a first dynamic coefficient of friction between the first main surface and the negative electrode plate is 0.52 to 0.66.

2. The nonaqueous electrolyte secondary battery according to claim 1, wherein the negative electrode plate includes a negative electrode active material layer, the negative electrode active material layer is in contact with the first main surface, the negative electrode active material layer includes negative electrode active material particles, and the negative electrode active material particles have a median value of circularities of 0.60 to 0.85.

3. The nonaqueous electrolyte secondary battery according to claim 2, wherein the negative electrode active material layer has a strip-like planar shape, the electrode assembly has an aspect ratio of 2.0 to 2.5, and the aspect ratio is calculated by the following formula (β):

$$R_2 = W/H_1 \qquad (\beta),\ \text{where}$$

$R_2$ represents the aspect ratio,

W represents a length of the negative electrode active material layer in a width direction, and $H_1$ represents the average length of the two line segments.

4. The nonaqueous electrolyte secondary battery according to claim 1, wherein the second main surface is in contact with the positive electrode plate, and a second dynamic coefficient of friction between the second main surface and the positive electrode plate is 0.70 to 0.85.

5. The nonaqueous electrolyte secondary battery according to claim 1, wherein the electrolyte solution includes methyl propionate.

* * * * *